US010255009B1

(12) United States Patent
Iwamoto

(10) Patent No.: US 10,255,009 B1
(45) Date of Patent: Apr. 9, 2019

(54) SYSTEM AND METHOD FOR DISPLAYING A PRINTING SOFTWARE USER INTERFACE

(71) Applicant: Konica Minolta Laboratory U.S.A., Inc., San Mateo, CA (US)

(72) Inventor: Shohei Iwamoto, San Mateo, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 0 days.

(21) Appl. No.: 16/145,675

(22) Filed: Sep. 28, 2018

(51) Int. Cl.
*G06F 3/12* (2006.01)
*H04N 1/00* (2006.01)

(52) U.S. Cl.
CPC ............ *G06F 3/123* (2013.01); *G06F 3/1205* (2013.01); *G06F 3/1255* (2013.01); *G06F 3/1288* (2013.01); *H04N 1/00413* (2013.01)

(58) Field of Classification Search
CPC ...... G06F 3/123; G06F 3/1225; G06F 3/1228; G06F 3/1255; G06F 3/1288; G06F 3/1205; H04N 1/00413
See application file for complete search history.

(56) References Cited

U.S. PATENT DOCUMENTS

| | | | | |
|---|---|---|---|---|
| 6,825,941 B1* | 11/2004 | Nguyen | ............... | G06F 3/1227 358/1.13 |
| 7,916,330 B2* | 3/2011 | Wada | .................... | G06F 3/1206 358/1.13 |
| 9,152,361 B2* | 10/2015 | Kishida | ................. | G06F 3/1225 |
| 2003/0234950 A1* | 12/2003 | Lay | ....................... | G06F 3/1204 358/1.14 |

* cited by examiner

*Primary Examiner* — Kent Yip
(74) *Attorney, Agent, or Firm* — Buchanan Ingersoll & Rooney PC

(57) ABSTRACT

A computer system is disclosed, which includes a non-transitory memory configured to store in the non-transitory memory, a universal printing software and a vendor original printing software, the universal printing software being configured to support printers from two or more vendors, and the vendor original printing software being configured to support a printer from a vendor from the two or more vendors, the universal printing software being configured to support a limited number of features of the printer from the vendor; and a user interface of the vendor original printing software configured to display features of the printer from the vendor and to highlight features which are not supported by the universal printing software but supported by the vendor original printing software when a property of the vendor original printing software is selected at a time of printing on the user interface of the vendor original printing software.

20 Claims, 13 Drawing Sheets

SYSTEM AND METHOD FOR DISPLAYING A PRINTING SOFTWARE USER INTERFACE

FIELD OF THE INVENTION

The present disclosure generally relates to a system and method for displaying differences in printing software user interfaces between a universal printer interface and a vendor specific printer interface, and more particularly, to highlighting differences on a user interface of the vendor original printing software for features which are not supported by the universal printing software but supported by the vendor original printing software.

BACKGROUND OF THE INVENTION

Printing software is known, which can print to a plurality of vendor products such as Mopria and AirPrint. Mopria and AirPrint enable printing, for example, from a mobile device to printers from different manufacturers, vendors, or brands. Mopria supports the Android operating systems, while AirPrint® is an Apple® technology for the macOS® and iOS operating systems for printing via a wireless Lan (Wi-Fi). These printing software support common printing features for a plurality of vendor printers (i.e., universal printing software).

To print using universal printing software, the user opens a document using a software application such as Adobe® Acrobat Reader®, Microsoft® Word®, then selects a "Print" icon or item in a function menu of the application. Software, for example, can be a mobile application. After that, the user selects a printer which is discovered by the universal printing software. The universal printing software provides printing feature options to the user based on the selected printer's capabilities. The user can then configure preferred printing options and print the document with the selected configurations.

However, each vendor of the printer (i.e. printer vendor) typically provides their original printing software), which includes a printer driver to print from the client device, for example, a mobile device. The user can choose either method (i.e., software, universal printing software or vendor printing software) to print from the client device.

Comparing the supporting features between universal printing software and vendor original printing software would be desirable, since vendor original printing software generally provides additional printing features or printing options that are not available with universal printing software. The universal printing software generally provides and supports enough features or options for the most users. However, the users may not know other features that are supported by the printer and/or which are available from vendor printing software since such features are not generally displayed in the universal printing software user interface if the user is using the universal printing software. This failure to provide the user with the additional available features is a lost opportunity for both of the users and vendor. Accordingly, it would be desirable to provide the user with a list of features or method to recognize the feature options which is not supported by the universal printing software in case the user installs both of the universal printing software (universal printing software) and vendor original printing software (vendor original printing software) on a client device.

SUMMARY OF THE INVENTION

In consideration of the above issues, it would be desirable to have a system and method, which can alert a user which printing feature options are not supported by the universal printing software such that the user can recognize additional features that the printer can perform upon request.

A computer system is disclosed comprising: a processor configured to execute software stored in memory; a non-transitory memory configured to store in the non-transitory memory, a universal printing software and a vendor original printing software, the universal printing software being configured to support printers from two or more vendors, and the vendor original printing software being configured to support a printer from a vendor from the two or more vendors, the universal printing software being configured to support a limited number of features of the printer from the vendor; and a user interface of the vendor original printing software configured to display features of the printer from the vendor and to highlight features which are not supported by the universal printing software but supported by the vendor original printing software when a property of the vendor original printing software is selected at a time of printing on the user interface of the vendor original printing software.

A method is disclosed for displaying features of printing software on a user interface, the method comprising: storing in a non-transitory memory, a universal printing software and a vendor original printing software, the universal printing software being configured to support printers from two or more vendors, and the vendor original printing software being configured to support a printer from a vendor from the two or more vendors, and the universal printing software being configured to support a limited number of features of the printer from the vendor; and displaying on the user interface of the vendor original printing software features of the printer from the vendor printer and highlighting features on the user interface which are not supported by the universal printing software when a property of the vendor original printing software is selected at a time of printing on the user interface of the vendor original printing software.

A system is disclosed comprising: a printer from a vendor; and a client device, the client device comprising: a processor configured to execute software stored in memory; a non-transitory memory having stored in the non-transitory memory, a universal printing software and a vendor original printing software; a display screen configured to display a user interface of the vendor original printing software; the universal printing software being configured to support printers from two or more vendors, and the vendor original printing software being configured to support the printer from the vendor; the universal printing software being configured to support a limited number of features of the printer from the vendor; and wherein the user interface of the vendor original printing software is configured to display features of the printer from the vendor and highlight features which are not supported by the universal printing software but supported by the vendor original printing software when a property of the vendor original printing software is selected at a time of printing on the user interface of the vendor original printing software.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings

DETAILED DESCRIPTION

Figure 1:
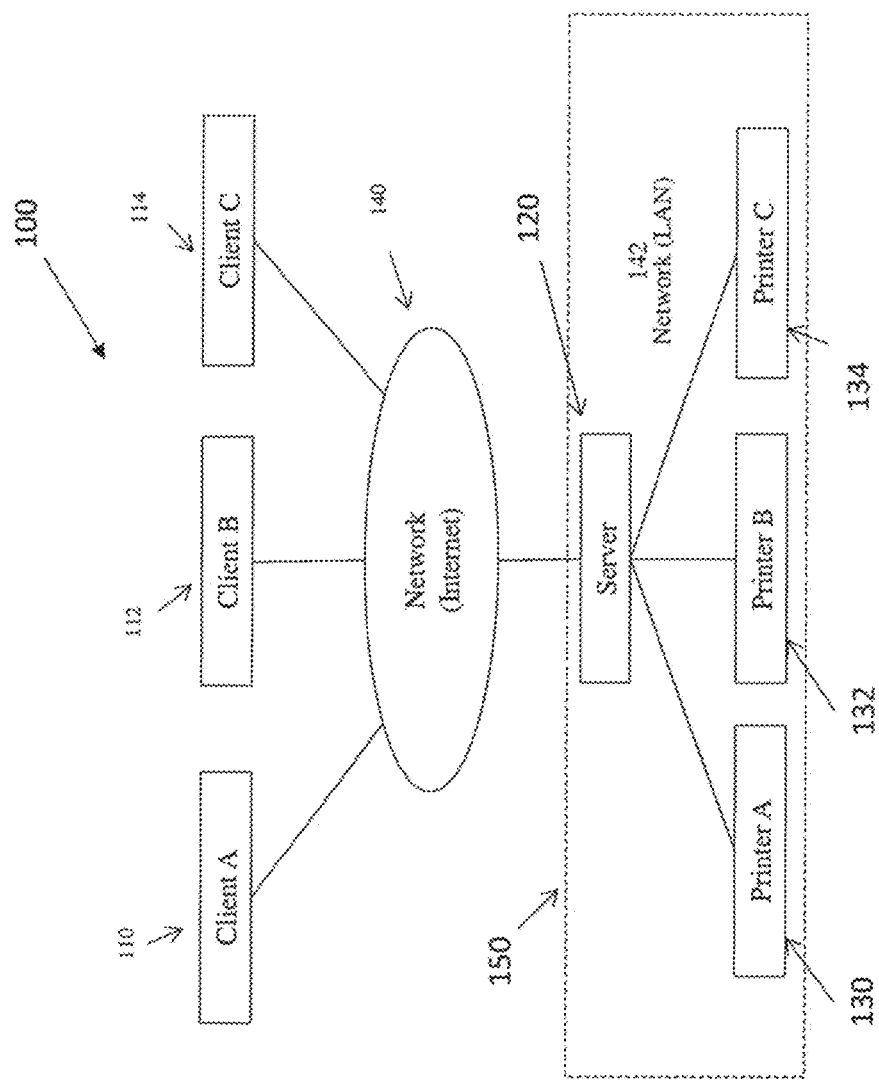
FIG. 1 is an illustration of an exemplary print system for printing from a mobile device in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, it would be desirable to provide a user with a relatively easy understanding of differences between supporting features of vendor original printing software and universal printing software when the user is printing to a vendor's printer by providing a unique user interface/user experience (UI/UX).

Universal printing software has been developed, which can allow a client device to print to vendor's product (i.e., printer or image forming apparatus), for example, through the use Mopria and AirPrint. However, printers also have original printing software such as a printer driver, which can have additional features, which are not readily available or known through a universal printing software application. However, it can be different for a user to understand the difference between the universal printing software and the vendor original printing software. Accordingly, it would be desirable to have a user interface, which can rather easily provide the differences to a user, and more particularly let a user know the features which are not supported by the universal printing software and can make the features available to a user. Thus, a system and method are disclosed that provides the user with the ability to rather easily understand the feature difference between the universal printing software and vendor original printing software.

For example, it would be desirable for a user of a printer from a vendor in which the user is not familiar to be able to rather easily recognize and understand the feature options and differences between the universal printing software, for example, which is available on a mobile device, and a vendor original printing software, for example, which is available on a computer device, for example, that is networked with one or more printers from a specific vendor.

Vendor original printing software can provide the printing feature options with multiple-tabs/-screens, and the vendor original printing software has tabs/screens to provide the feature options supported by the universal printing software. In accordance with an exemplary embodiment, printing feature options which are not supported by the universal printing software can be provided on the other tabs/screens. In accordance with an exemplary embodiment, the user can understand the feature options difference by putting the printing feature options on the separate tabs/screens. In addition, the vendor original printing software can check the latest features supported by the universal printing software. When the vendor original printing software finds the same features with the universal printing software in the vendor own features tabs/screens, the feature option will be moved to the universal printing software tab/screen. Thus, users can understand the up-to-date feature differences between the universal printing software and the vendor original printing software.

In accordance with an exemplary embodiment, vendor original printing software provides the printing feature options with multiple-tabs/-screens, and the printing software highlights the feature options which are not supported by universal printing software. Vendor original printing software checks the latest features supported by the universal printing software. When the vendor original printing software finds same features with the universal printing software in vendor own features, the feature option highlight will be removed. Thus, the users can understand the up-to-date feature differences between the universal printing software and the vendor original printing software.

FIG. 1 is an illustration of an exemplary system 100 for printing a print job sent from a client device, for example, a mobile device 110, 112, 114 to a printer 130, 132, 134 in accordance with an exemplary embodiment. As shown in FIG. 1, the system 100 can include at least one client device 110, 112, 114, an optional server 120, and a plurality of printers or image forming apparatuses 130, 132, 134, (i.e., vendor printers) which are connected, for example by a communication network (or network) and/or a local area network (LAN) 140, and wherein the plurality of printers or image forming apparatuses (vendor printers). In accordance with an exemplary embodiment, the plurality of printers 130, 132, 134, can be, for example, in a print shop, an office, or a plurality of offices or buildings 150.

In accordance with an exemplary embodiment, the communication network or network 140 can be a public telecommunication line and/or a network (for example, LAN or WAN). Examples of the communication network 140 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF), infrared (IR) transmission, and/or near-field communication (NFC).

Figure 2:
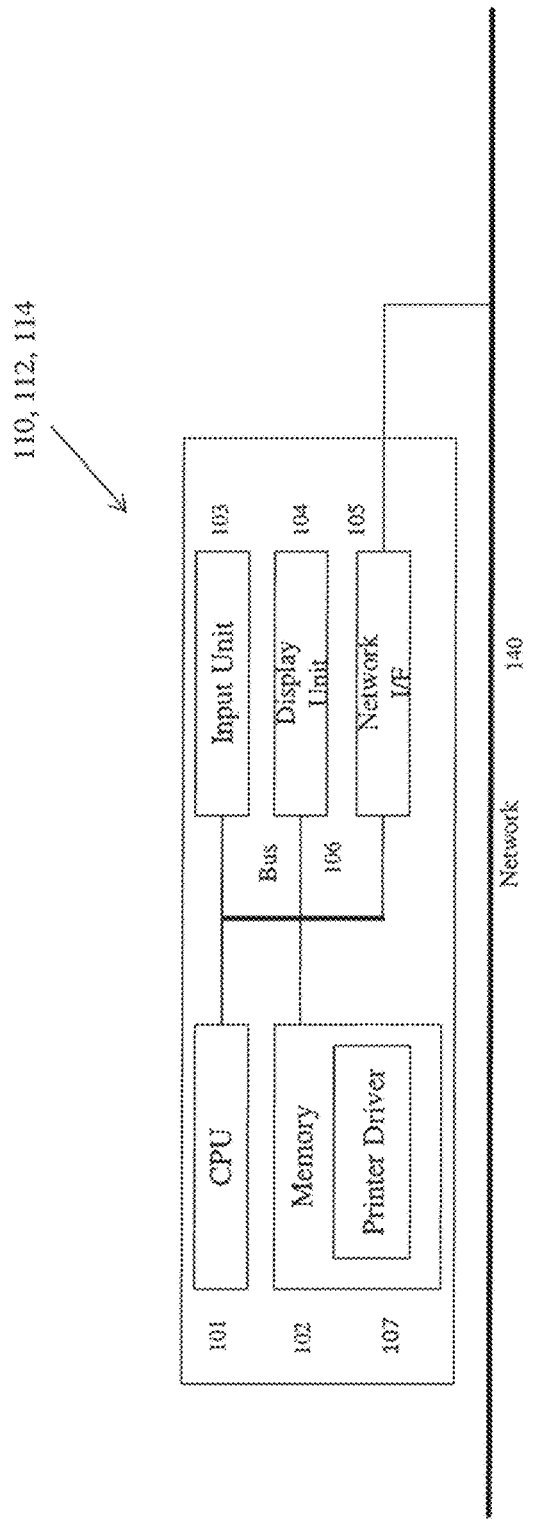
FIG. 2 is an illustration of a client device in accordance with an exemplary embodiment.

FIG. 2 is an illustration of a client device 110, 112, 114 in accordance with an exemplary embodiment. As shown in FIG. 2, the client device 110, 112, 114 can include a processor or central processing unit (CPU) 101, and one or more memories 102 for storing software programs (for example, a universal printing software and one or more vendor printing software) and data (such as files to be printed). The client device includes software configured to send data for a print job to the server 120 and/or the one or more printers 130, 132, 134. The data sent from the client device 110, 112, 114 to the print server 120, or the one or more printers 130, 132, 134 may include image data (document data) and print setting data. The processor or CPU 101 carries out the instructions of a computer program, which operates and/or controls at least a portion of the functionality of the client device 110. The client device 110, 112, 114, can also include an input unit 103, a display unit or graphical user interface (GUI) 104, and a network interface (I/F) 105, which is connected to a communication network (or network) 140. A bus 106 can connect the various components 101, 102, 103, 104, 105 within the at least one client device 110, 112, 114.

The client device 110, 112, 114 includes an operating system (OS), which manages the computer hardware and provides common services for efficient execution of various software programs. The software programs can include, for example, printing software (i.e., a universal printing software and/or one or more vendor original printing software), which can control transmission of data for a print job from the client device 110, 112, 114 to an optional server 120 and the one or more printers 130, 132, 134. In accordance with an exemplary embodiment, the client device 110, 112, 114, can be a computer, a tablet, a cell phone, or a mobile device.

Figure 3:
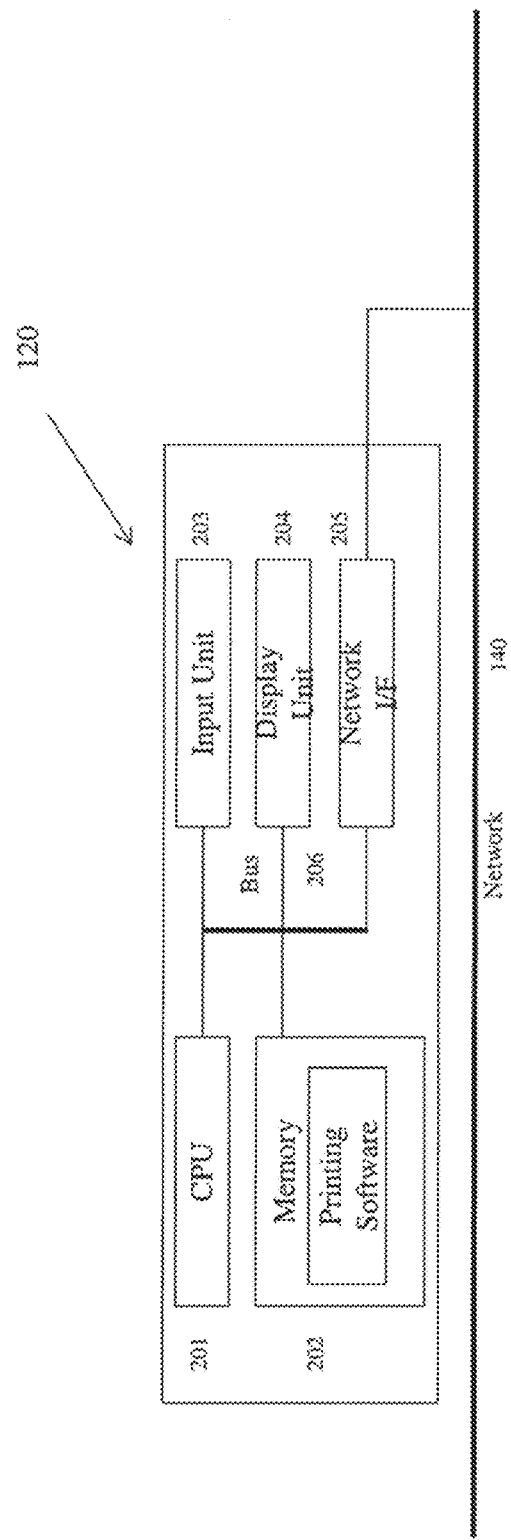
FIG. 3 is an illustration of a server in accordance with an exemplary embodiment.

FIG. 3 is an illustration of an optional server 120 in accordance with an exemplary embodiment. As shown in FIG. 3, the server 120 can include a processor or central processing unit (CPU) 201, and one or more memories 202 for storing software programs and data including a job management program. The processor or CPU 201 carries out the instructions of a computer program, which operates and/or controls at least a portion of the functionality of the server 120. The server 120 can also include an input unit 203, a display unit or graphical user interface (GUI) 204, and a network interface (I/F) 205, which is connected to a communication network (or network) 140. A bus 206 can connect the various components 201, 202, 203, 204, 205 within the sever 120. The server 120 includes an operating system (OS), which manages the computer hardware and provides common services for efficient execution of various software programs. The optional server 120 can be computer and executes a job management program that manages a print job. In addition, the optional server 120, for example, can host vendor original printing software for one or more of the printers 130, 132, 134 as disclosed herein.

Figure 4:
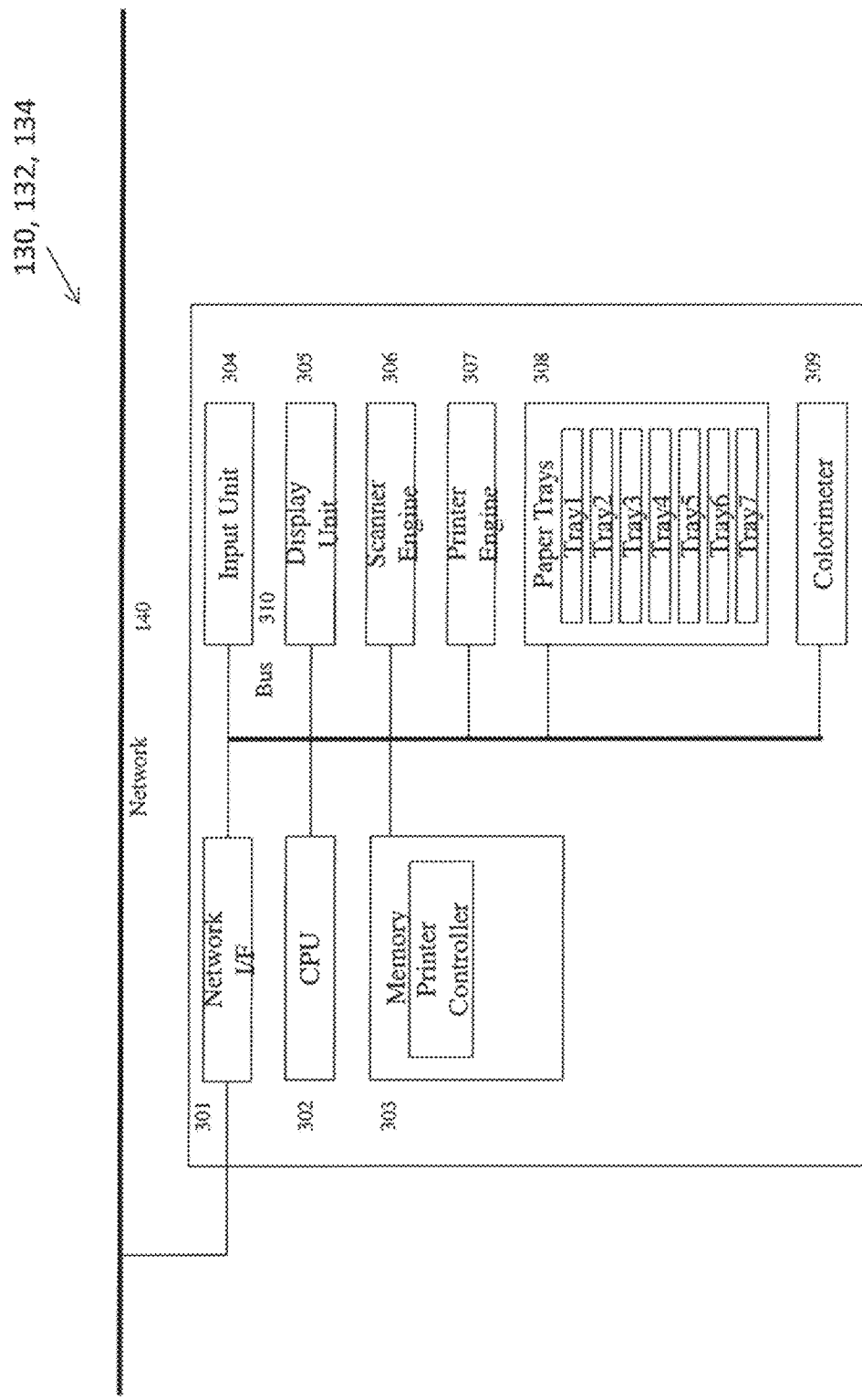
FIG. 4 is an illustration of a printer or image forming apparatus in accordance with an exemplary embodiment.

FIG. 4 is an illustration of a vendor printer 130, 132, 134, in accordance with an exemplary embodiment. The vendor printer 130, 132, 134, can include a network interface (I/F) 301, which is connected to the communication network (or network) 140, 142, a processor or central processing unit (CPU) 302, and one or more memories 303 for storing software programs and data (such as files to be printed). For example, the software programs can include a printer controller. The processor or CPU carries out the instructions of a computer program, which operates and/or controls at least a portion of the functionality of the printer 130, 132, 134. The printer 130, 132, 134, can also include an input unit 304, a display unit or graphical user interface (GUI) 305, a scanner engine (or scanner) 306, a printer engine 307, at least one paper tray 308, and more preferably a plurality of paper trays, 308, for example, Tray 1, Tray 2, Tray 3, Tray 4 . . . Tray N, and a colorimeter 309. The paper tray 308 can include a bin or tray, which holds a stack of a print media, for example, a paper or a paper-like product.

In accordance with an exemplary embodiment, for example, the colorimeter 309 can be one or more color sensors or colorimeters, such as an RGB scanner, a spectral scanner with a photo detector or other such sensing device known in the art, which can be embedded in the printed paper path, and an optional finishing apparatus or device (not shown). A bus 310 can connect the various components 301, 302, 303, 304, 305, 306, 307, 308, 309 within the printer 130. The printer 130, 132, 134, also includes an operating system (OS), which manages the computer hardware and provides common services for efficient execution of various software programs.

In accordance with an exemplary embodiment, it can be within the scope of the disclosure for the printer 130, 132, 134, to be a copier. The printer engine or print engine 307 has access to a print media of various sizes for a print job, which can be, for example, stored in the input tray. A "print job" or "document" can be a set of related sheets, usually one or more collated copy sets copied from a set of original print job sheets or electronic document page images, from a particular user, or otherwise related.

For example, in accordance with an exemplary embodiment, an image processing section within the printer 130, 132, 134 can carry out various image processing under the control of a print controller or CPU 302, and sends the processed print image data to the print engine 307. The image processing section can also include a scanner section (scanner 306) for optically reading a document. The scanner section receives the image from the scanner 306 and converts the image into a digital image. The print engine 307 forms an image on a print media (or recording sheet) based on the image data sent from the image processing section. The central processing unit (CPU) (or processor) 302 and the memory 303 can include a program for RIP processing (Raster Image Processing), which is a process for converting print data included in a print job into Raster Image data to be used in the printer or print engine 307. The CPU 302 can include a printer controller configured to process the data and job information received from the server 120, for example, received via the network connection unit and/or input/output section (I/O section) 304.

The CPU 302 can also include an operating system (OS), which acts as an intermediary between the software programs and hardware components within the printer 130, 132, 134. The operating system (OS) manages the computer hardware and provides common services for efficient execution of various software applications. In accordance with an exemplary embodiment, the printer controller can process the data and job information received from the one or more client devices 110 to generate a print image. In accordance with an exemplary embodiment, each of the one or more printers 130, 132, 134 supports at least one vendor original printing software application.

The network I/F 301 performs data transfer with the client device 110, 112, 114, and/or server 120. The printer controller can be programmed to process data and control various other components of the multi-function peripheral to carry out the various methods described herein. In accordance with an exemplary embodiment, the operation of printer section commences when the printer section receives data for a print job from the client device 110, 112, 114, and/or server 120 via the network I/F 301. The data for the print job may include any kind of page description languages (PDLs), such as PostScript® (PS), Printer Control Language (PCL), Portable Document Format (PDF), and/or XML Paper Specification (XPS). Examples of printers 130, 132, 134, consistent with exemplary embodiments of the disclosure include, but are not limited to, a multi-function peripheral (MFP), a laser beam printer (LBP), an LED printer, and a multi-function laser beam printer including copy function.

Figure 5:
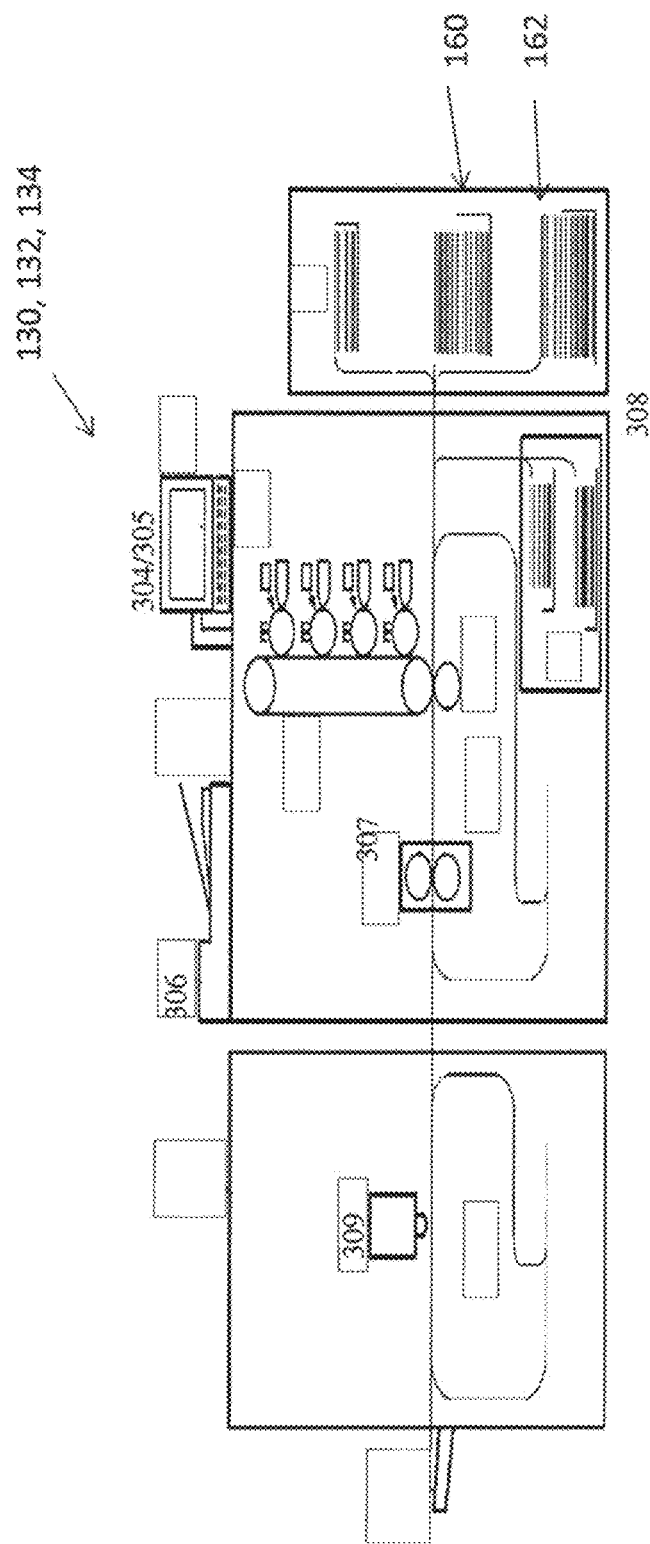
FIG. 5 is an illustration of a printer in accordance with an exemplary embodiment.

FIG. 5 is an illustration of a printer (or image forming apparatus) 130, 132, 134 in accordance with an exemplary embodiment. The printer 130, 132, 134 includes the input unit 304, the display unit or graphical user interface (GUI) 305, the scanner engine 306, the printer engine 307, the plurality of paper trays 308, for example, Tray 1, Tray 2, Tray 3, Tray 4 . . . Tray N, and the colorimeter 309. As shown in FIG. 5, each of the plurality of paper trays 308 can be configured to hold a print media 160, for example, a stack 162 of print media (or paper) 160.

In accordance with an exemplary embodiment, the print media 160 is preferably a paper or paper-like media having one or more print media attributes. The print media attributes can include, for example, paper color, coating, grain direction, printing technology, brightness, CIE, tint, whiteness, labColor, etc. In order to maximize print quality, the print media attributes of each type of print media should be input into or hosted on the printer 130, 132, 134, for example, on printer configuration settings of the printer 130, 132, 134 to obtain the highest quality output. In accordance with an exemplary embodiment, at least one printer of the plurality of printers 130, 132, 134 can be a production printer like bizhub PRESS 1100 by Konica Minolta®.

Figure 6:
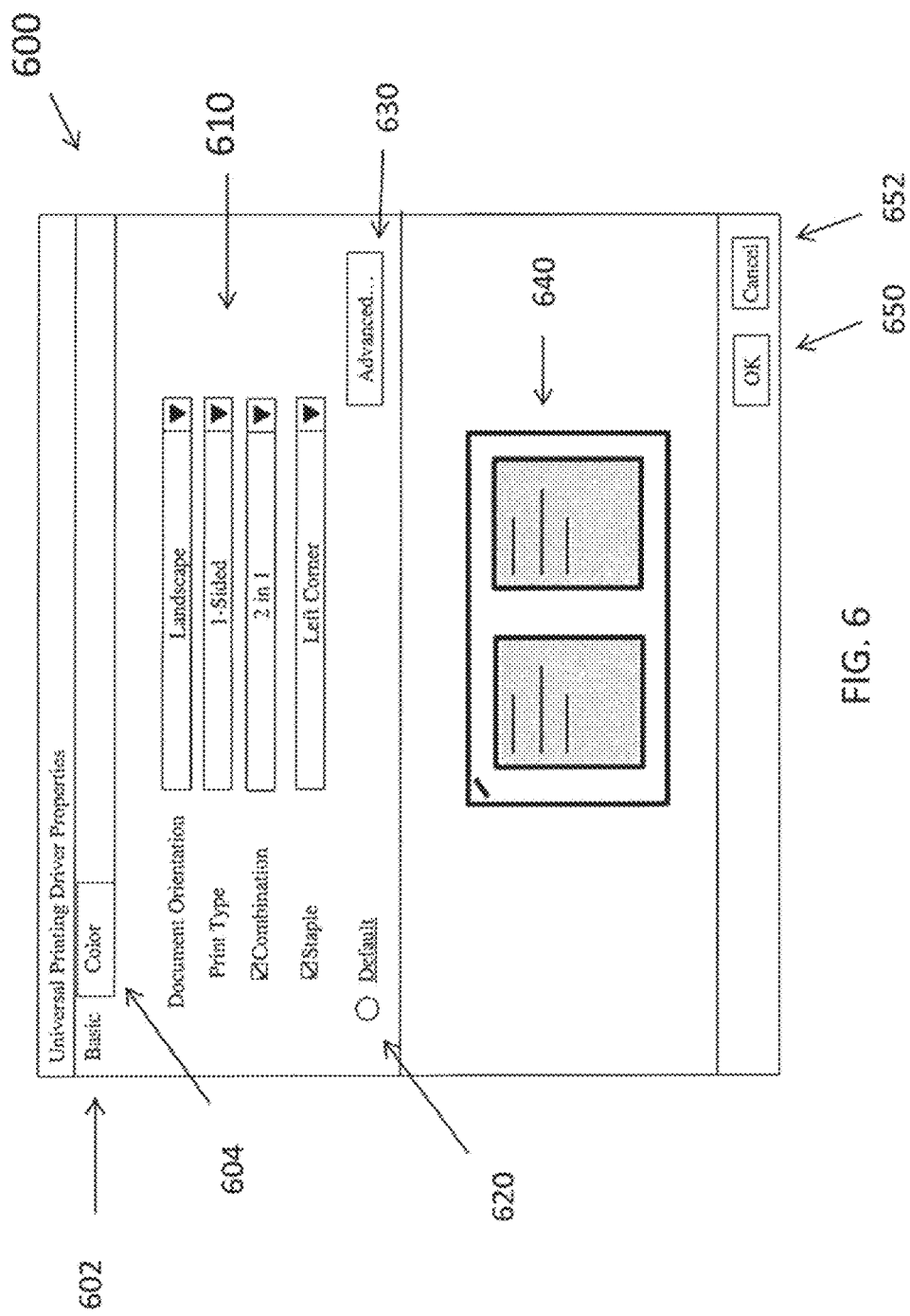
FIG. 6 is an illustration of an exemplary universal printer driver user interface.

FIG. 6 is an illustration of an exemplary universal printer driver user interface 600. As shown in FIG. 6, the universal printer driver user interface 600 (and corresponding universal printing software) enables a client device 110, 112, 114, for example, a computer or mobile device to print to a printer 130, 132, 134, without having to install a printer driver for each and every printer 130, 132, 134, for example, a networked printer. The universal printer driver user interface 600 can be compatible with any printer or multi-functional printer (MFP) that utilizes PCL6 or PostScript languages, such that a wide range of printer devices from different vendors (or manufacturers), which can be assessed on the single printer driver (i.e., universal printer driver).

As shown in FIG. 6, the universal printer driver user interface 600 can be displayed on a display unit 104 of the client device 110, 112, 114. The universal printer driver user interface 600 can include one or more tabs (or properties) corresponding to a type of printing (i.e., property), for example, basic printing 602 and color printing 604. The universal printer driver user interface 600 can also include a plurality of drop-down list or pull-down lists 610. The plurality of drop-down lists or pull-down lists 610, can include, for example, document orientation, print type, combination (for example, combining two or more pages onto a single page), and staple. In accordance with an exemplary embodiment, for example, document orientation can include Landscape or Portrait, Print type can include one-sided (1-sided) or two-sided (2-sided), combination can two images per page (2 in 1), and staple orientation, for example, left corner, right corner. In addition, the universal printer driver user interface 600 can include a default setting 620 in the form of a check box or radio button, and an advanced settings tab 630 in the form, for example, of a push box.

The universal printer driver user interface 600 can also include a print preview 640. For example, as shown in FIG. 6, the print preview 640 shows that the document will be printed on one side of the print media, two images per page, in a landscape orientation, and with a staple in the left corner. The universal printer driver user interface 600 can also include an "OK" button (i.e., authorizes the printer to execute the print job) 650 and a "Cancel" button 652 (i.e., cancel the print job either before printing).

Figure 7:
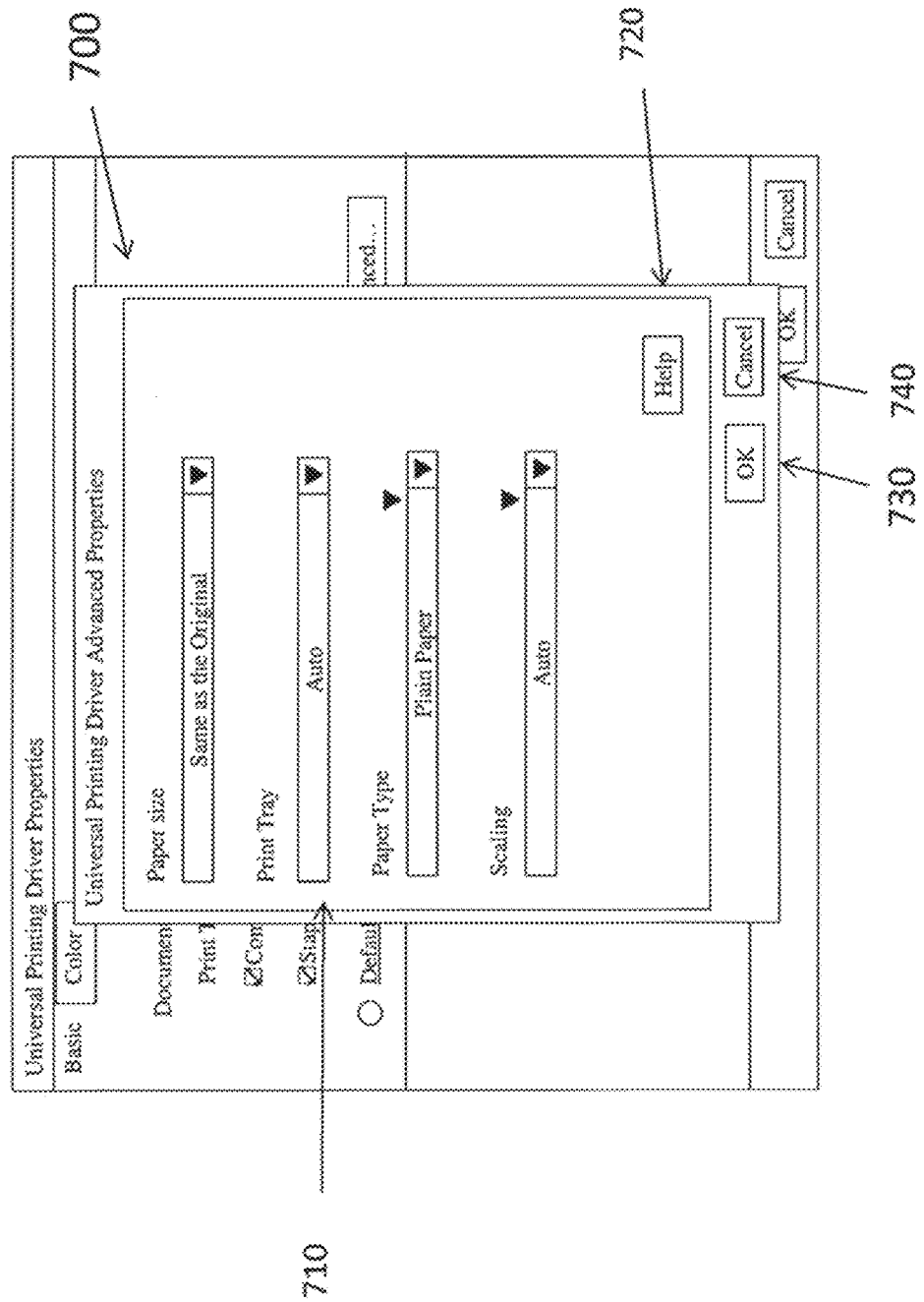
FIG. 7 is an illustration of an advance display of the exemplary universal printer driver user interface as shown in FIG. 6.

FIG. 7 is an illustration of an advance display 700 of the exemplary universal printer driver user interface 600 as shown in FIG. 6. As shown in FIG. 7, the advance display 700 can include drop-down lists or pull-down lists 710, for example, for paper size, selection of a print tray from a plurality of print trays, paper type, and scaling (i.e., stretching or shrinking the image to fit a specified area). In addition, a "Help" button 720, an "OK" button 730, and a "Cancel" button 740 can be provided on the advance display 700.

Figure 8:
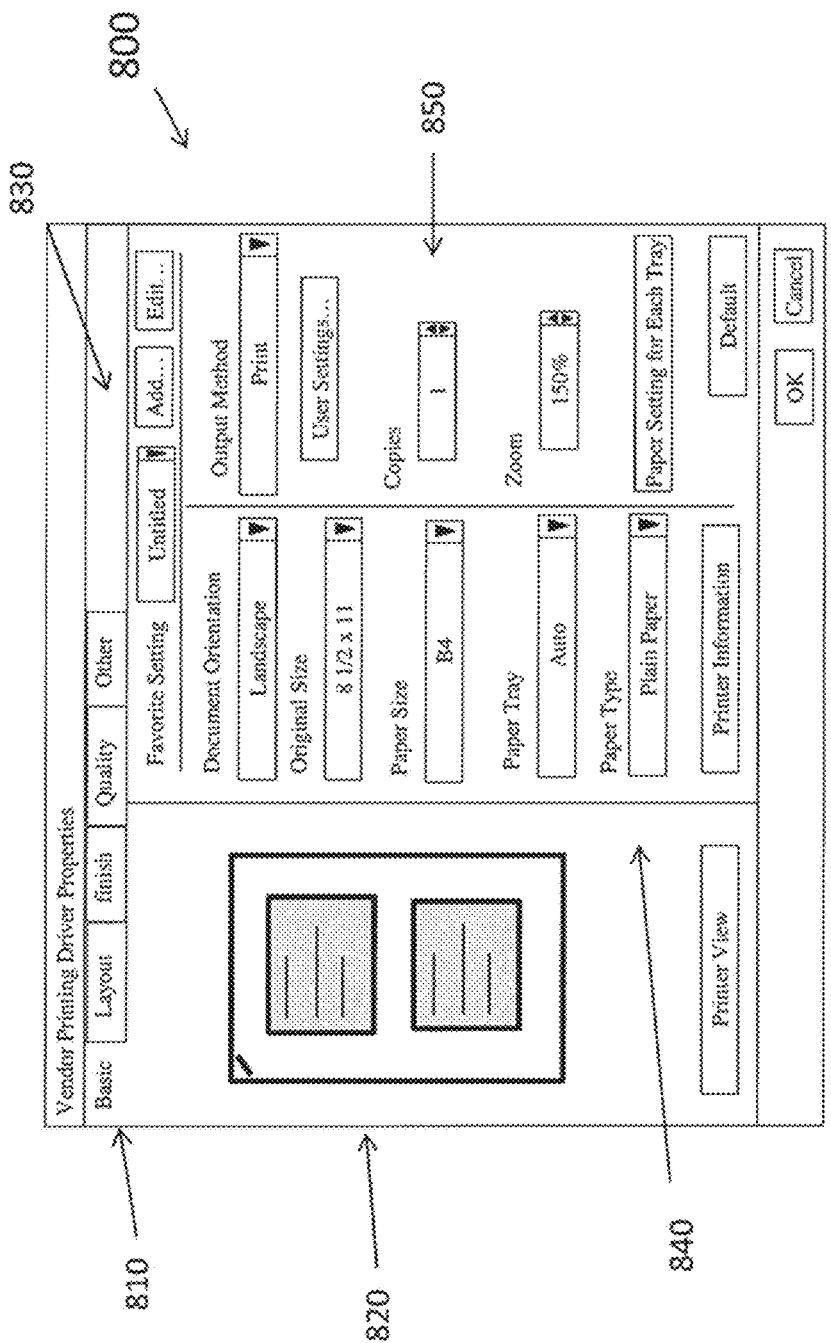
FIG. 8 is an illustration of an exemplary vendor printer driver user interface.

FIG. 8 is an illustration of an exemplary vendor printer driver user interface 800. As shown in FIG. 8, the vendor printer driver user interface 800 can include a plurality of tabs (or plurality of properties) 810, for example, a "Basic" tab, a "Layout" tab, a "finish" tab, a "Quality" tab, and an "Other" tab. The "Basic" layout can include a print preview 820, and a plurality of settings 830, which can include, for example, Favorite Setting with one or more buttons, for example, an "Untitled" button, an "Add" button, and an "Edit" button. In addition, one or more drop-down lists or pull-down lists 840 can be included, for example, for "Document Orientation", "Original Size", "Paper Size", "Paper Tray", "Paper Type", and "Output Method". In addition, buttons or a scrolling interface 850 can be included, for example, "User Setting", "Copies", "Zoom", "Paper Setting for Each Tray", "Default", "OK", and "Cancel".

Figure 9:
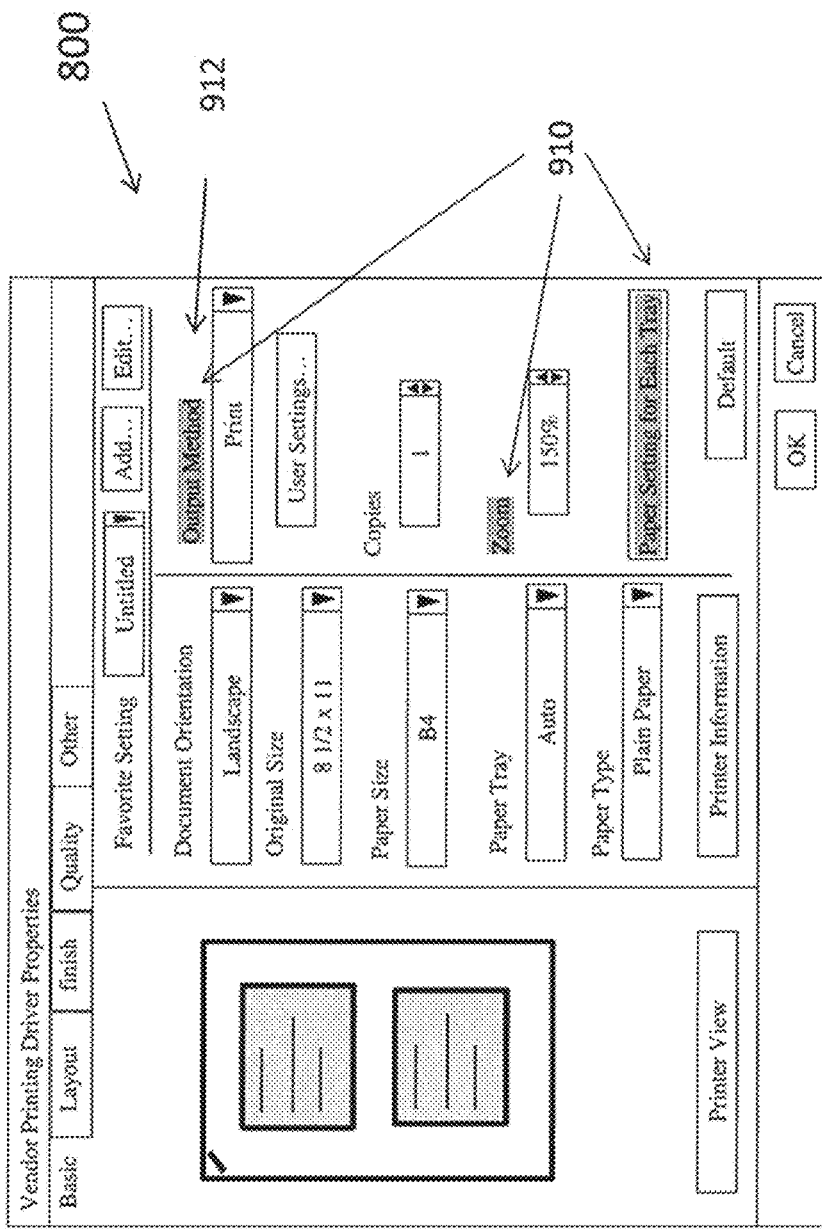
FIG. 9 is an illustration of the exemplary vendor printer driver user interface as shown in FIG. 8 in which features not included in the exemplary universal printer driver user interface are highlighted.

FIG. 9 is an illustration of the exemplary vendor printer driver user interface 800 as shown in FIG. 8 in which features 910 that are not included in the exemplary universal printer driver software are highlighted 912, or brought to the attention of a user via different graphics, for example, a different font, different colors of the font, or any other known method, which alerts the user that certain features of the vendor printing software is not available in the universal printing software. In accordance with an exemplary embodiment, the vendor printer driver user interface 900 as shown in FIG. 9 can be generated on the client device 110, 112, 114 based on information stored in the memory 102 of the client device 110, 112, 114, information received from the server 120, which can be configured to hosts one or more vendor original printing software, and/or from a vendor printer 130, 132, 134 having a vendor original printing software hosted on the printer 130, 132, 134.

Figure 10:
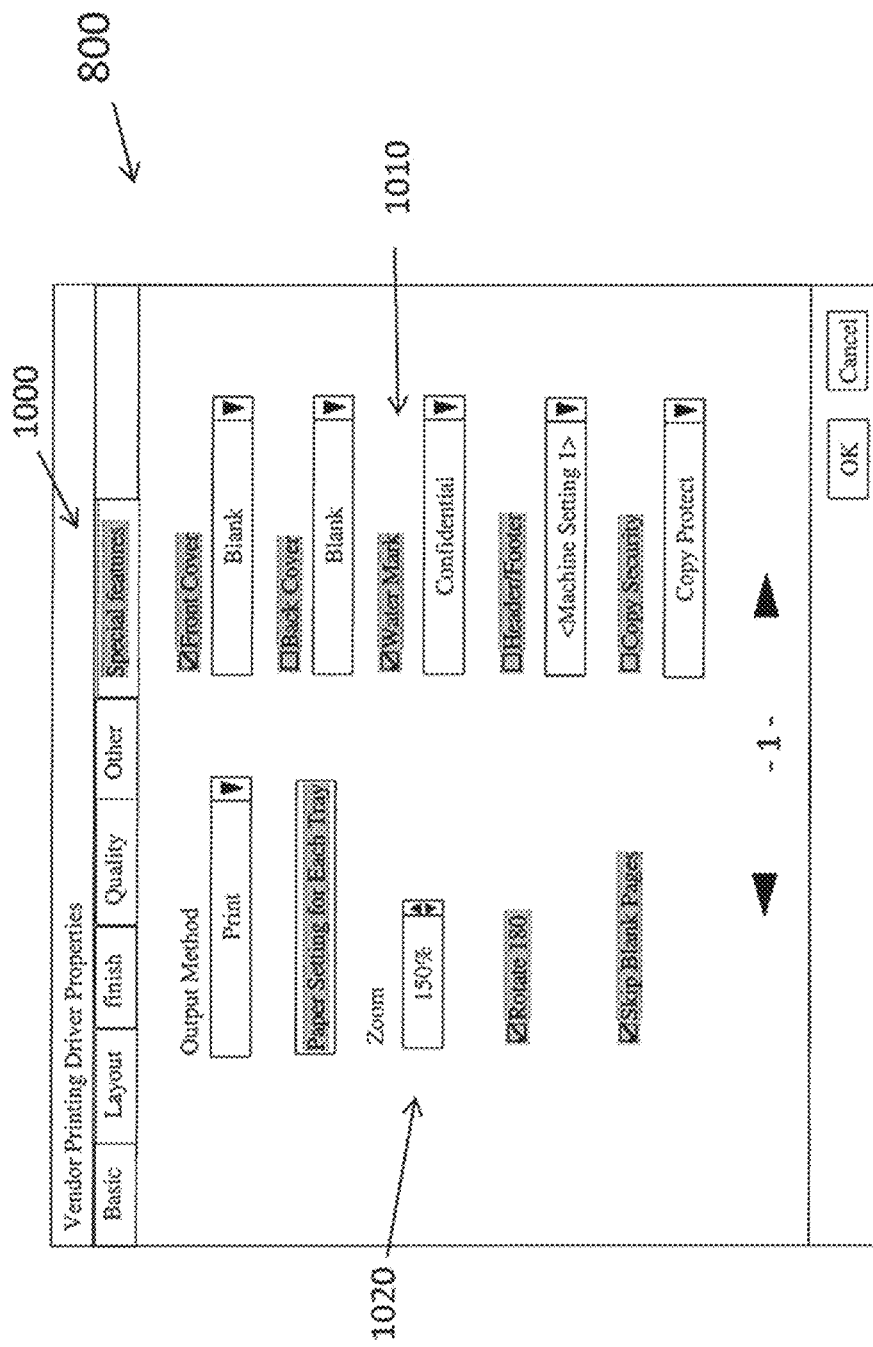
FIG. 10 is an illustration of the vendor driver user interface as shown in FIG. 8 in which features not include in the exemplary universal printer driver user interface are collected into one tab and highlighted.

FIG. 10 is an illustration of a "Special Features" tab 1010 on the vendor driver user interface 800 as shown in FIG. 8 in which features that are not include in the exemplary universal printer driver user interface are collected into one tab and highlighted. As shown in FIG. 10, in accordance with an exemplary embodiment, the vendor driver user interface 800 can include a "Special Features" tab 1010, which is configured to automatically collect and highlight on at least one tab, and more preferably on a single tab, special features, which are not included in the universal printing software (and universal printer driver).

In accordance with an exemplary embodiment, upon selection of the special features tab 1010 by the user, the special features tab 1010 can display each of the one or more features that are supported by the vendor original printing software, and which are not supported by the universal printing software. Alternatively, if the vendor original printing software supports a plurality of features, which cannot be illustrated on a signal tab, two or more tabs can be used to highlight or identify those features, which are not supported by the universal printer driver. In addition, if the universal printing software (universal printer driver) has been updated to include a previous feature that were not available with the universal printing software, the updated feature(s) will no longer be highlighted on the vendor driver user interface 800. For example, if the universal printing software (or universal printer driver) supports an "Output Method" and "Zoom" as shown in FIG. 10, "Output Method" and "Zoom" will no longer be highlighted.

Figure 11:
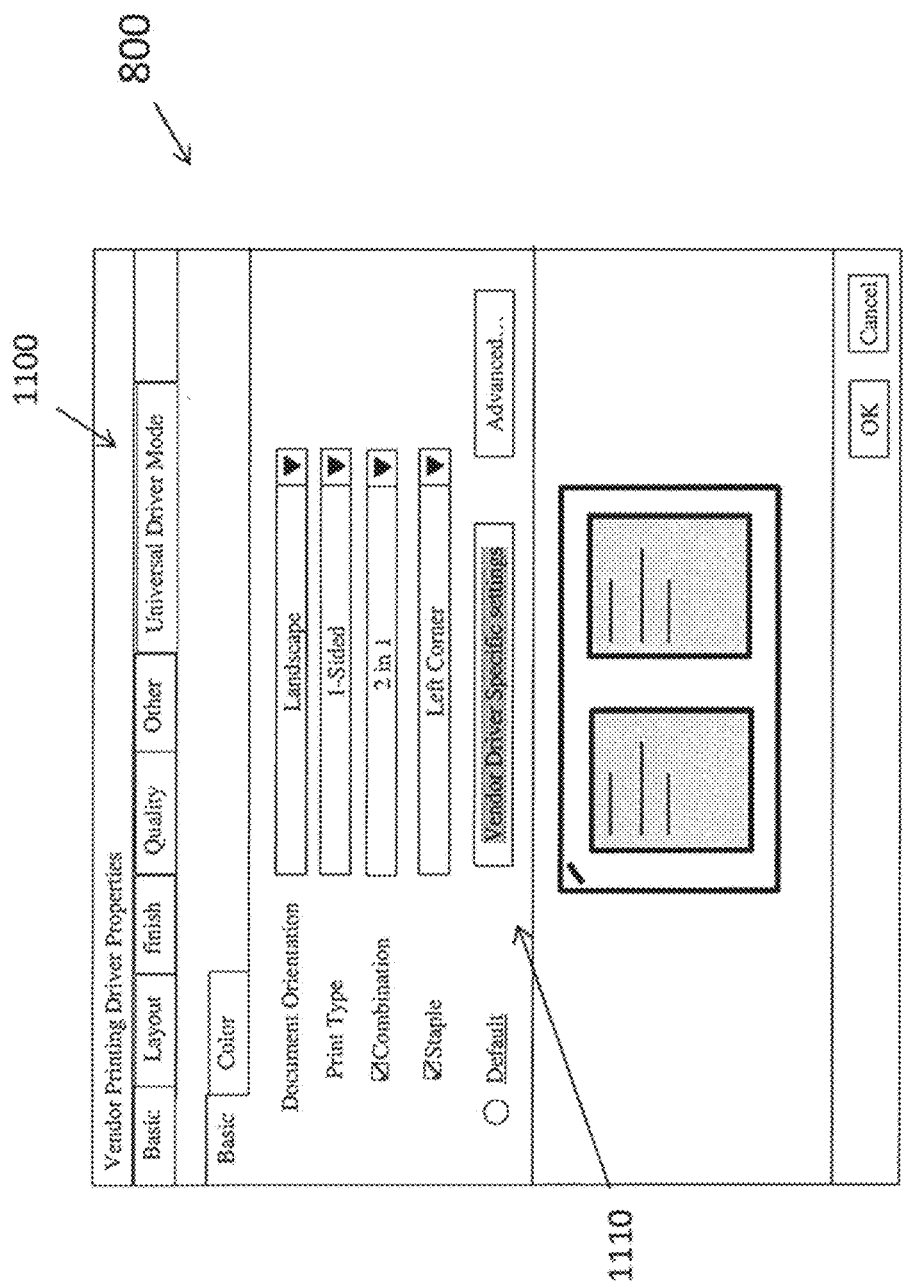
FIG. 11 is an illustration of the vendor driver user interface as shown in FIG. 8 having a tab, which displays an exemplary universal printer driver user interface.

FIG. 11 is an illustration of the vendor driver user interface 800 as shown in FIG. 8 having a tab, which displays an exemplary universal printer driver user interface. As shown in FIG. 11, the vendor driver user interface 800 can include a "Universal Driver Mode" 1100, which displays a tab (or tab-like) universal printer driver user interface so that users which use the universal driver printer interface can rather easily use the vendor printer driver software and the corresponding vendor printer driver interface. In addition, the "Universal Driver Mode" 1100 can also display "Vendor Driver Specific Settings" 1110.

Figure 12:
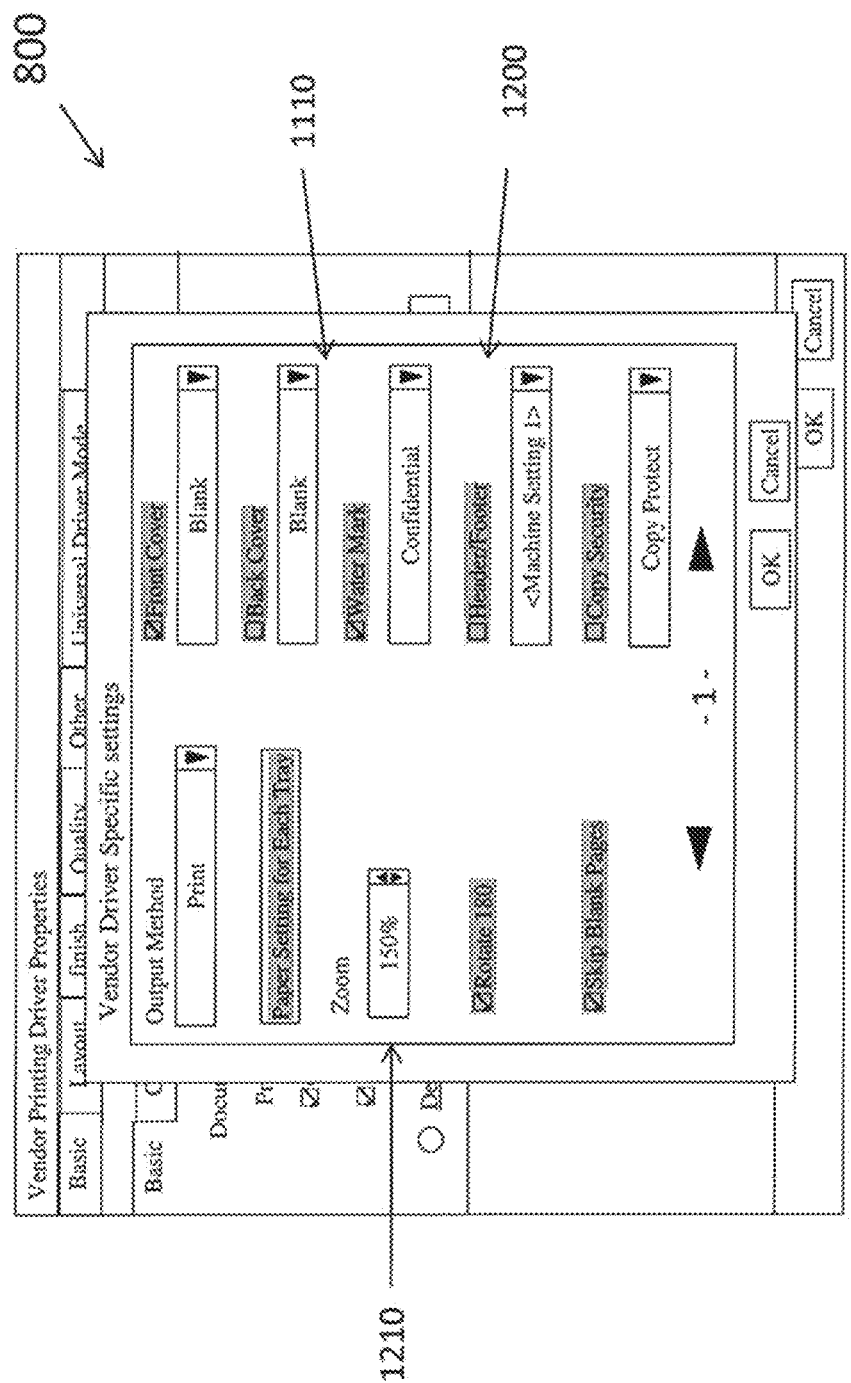
FIG. 12 is an illustration of specific setting user interface on the exemplary vendor driver user interface.

FIG. 12 is an illustration of the "Vendor Driver Specific Setting" 1110 as displayed on the user interface on the exemplary vendor driver user interface 800. As shown in FIG. 12, for example, the Vender Driver Specific settings 1110 can include features or settings 1200, such as a "paper setting for each tray", "rotate", "skip blank pages", "front cover", "back cover", "water mark", "header/footer", and "copy security". In addition, as described above, if a "Vender Driver Specific" setting has been added to the universal printer driver, the specific feature will no longer be highlighted, for example, "Output Method" and/or "Zoom" 1210.

Figure 13:
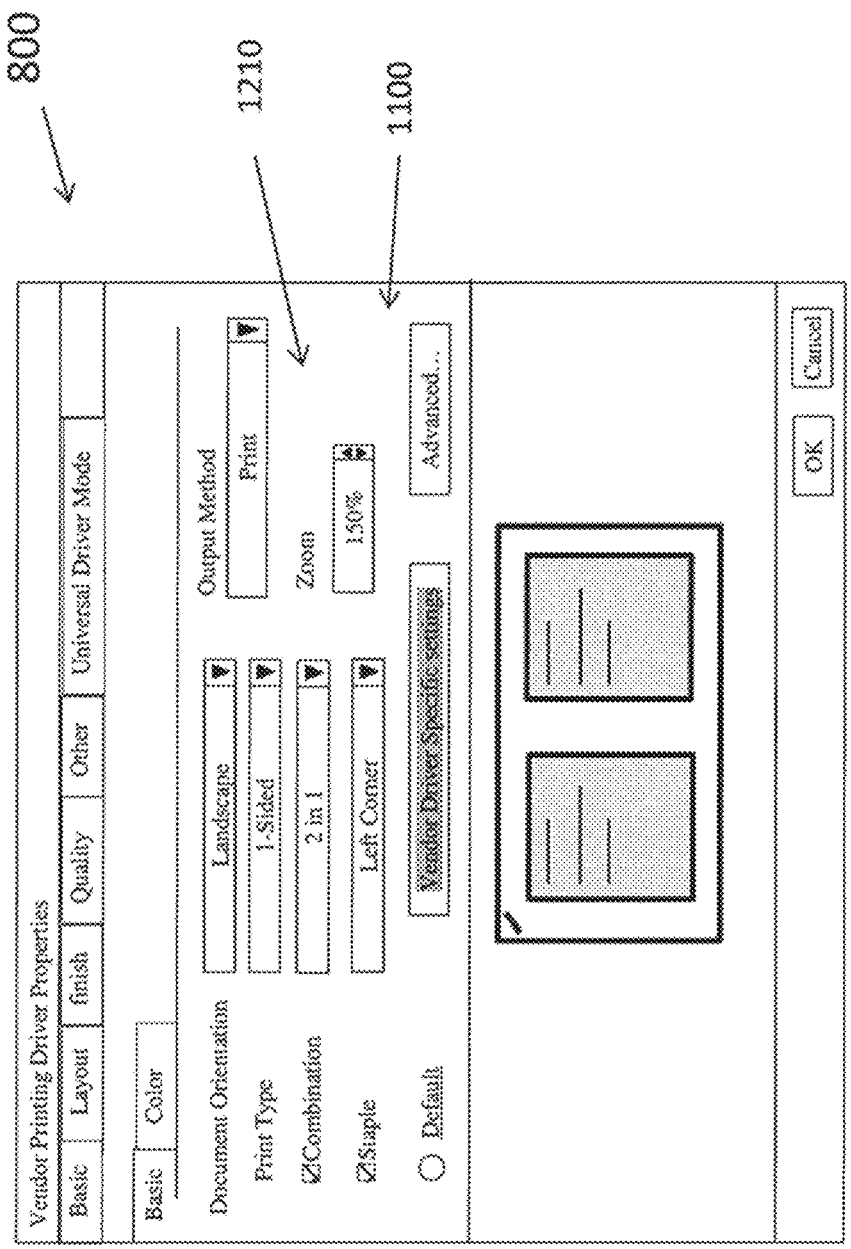
FIG. 13 is an illustration of the vendor driver user interface and the universal driver mode after a feature has been added to the universal driver mode in accordance with an exemplary embodiment.

FIG. 13 is an illustration of the vendor driver user interface 800 and the universal driver mode 1100 after a feature has been added to the universal driver mode in accordance with an exemplary embodiment. As shown in FIG. 13, the "Universal Driver Mode" 1100 has been updated to include both the "Output Method" and "Zoom" 1210.

In accordance with an exemplary embodiment, a second vendor original printing software can be displayed on the display unit 104 of the client device 110, 112, 114. For example, the second vendor original printing software can support limited features of the printer 130, 132, 134 from the vendor. Thus, the user interface of the second vendor original printing software can be configured to highlight differences between the second vendor original printing software and the universal printing software and differences between the second vendor original printing software and the vendor original printing software.

In accordance with an exemplary embodiment, a computer program product comprising a computer usable non-transitory medium having a computer readable program code embedded therein for displaying features of printing software on a user interface, the process comprising: storing in a non-transitory memory, a universal printing software and a vendor original printing software, the universal printing software being configured to support printers from two or more vendors, and the vendor original printing software being configured to support a printer from a vendor from the two or more vendors, and the universal printing software being configured to support a limited number of features of the printer from the vendor; displaying on the user interface of the vendor original printing software features of the printer from the vendor printer and highlighting features which are not supported by the universal printing software but supported by the vendor original printing software when a property of the vendor original printing software is selected at a time of printing on the user interface of the vendor original printing software.

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system comprising:
    a processor configured to execute software stored in memory;
    a non-transitory memory configured to store in the non-transitory memory, a universal printing software and a vendor original printing software, the universal printing software being configured to support printers from two or more vendors, and the vendor original printing software being configured to support a printer from a vendor from the two or more vendors, the universal printing software being configured to support a limited number of features of the printer from the vendor; and
    a user interface of the vendor original printing software configured to display features of the printer from the vendor and to highlight features which are not supported by the universal printing software but supported by the vendor original printing software when a property of the vendor original printing software is selected at a time of printing on the user interface of the vendor original printing software.

2. The computer system of claim 1, wherein the user interface of the vendor original printing software is configured to update the highlighted features when a feature is supported by a latest version of the universal printing software.

3. The computer system of claim 1, wherein the user interface of the vendor original printing software comprises a list of features which are not supported by the universal printing software.

4. The computer system of claim 1, wherein the user interface of the vendor original printing software comprises a tab that imitates a user interface of the universal printing software.

5. The computer system of claim 4, wherein the tab on the user interface of the vendor original printing software displays one or more features which are not supported by the universal printing software.

6. The computer system of claim 4, wherein the tab on the user interface of the vendor original printing software is updated based on the interface of a latest version of the universal printing software.

7. The computer system of claim 1, wherein the vendor original printing software supports full features of the printer of the vendor.

8. The computer system of claim 1, further comprising:
a second vendor original printing software configured to support the printer from the vendor.

9. The computer system of claim 1, wherein the second vendor original printing software is configured to support limited features, and
a user interface of the second vendor original printing software is configured to highlight differences between the second vendor original printing software and the universal printing software, and differences between the second vendor original printing software and the vendor original printing software.

10. The computer system of claim 1, wherein the printer from the vendor receives a print job from the user interface and prints the print job.

11. A method for displaying features of printing software on a user interface, the method comprising:
storing in a non-transitory memory, a universal printing software and a vendor original printing software, the universal printing software being configured to support printers from two or more vendors, and the vendor original printing software being configured to support a printer from a vendor from the two or more vendors, and the universal printing software being configured to support a limited number of features of the printer from the vendor; and
displaying on the user interface of the vendor original printing software features of the printer from the vendor printer and highlighting features on the user interface which are not supported by the universal printing software when a property of the vendor original printing software is selected at a time of printing on the user interface of the vendor original printing software.

12. The method of claim 11, further comprising:
updating the highlighted features when a feature is supported by a latest version of the universal printing software.

13. The method of claim 11, further comprising:
showing on the user interface of the vendor original printing software comprises a list of features which are not supported by the universal printing software.

14. The method of claim 11, further comprising:
providing a tab that imitates a user interface of the universal printing software on the user interface of the vendor original printing software.

15. The method of claim 14, further comprising:
displaying one or more features which are not supported by the universal printing software on the tab on the user interface of the vendor original printing software.

16. The method of claim 14, further comprising:
updating the tab on the user interface of the vendor original printing software based on the interface of the latest version of the universal printing software.

17. The method of claim 11, further comprising:
displaying a second vendor original printing software on the user interface, the second vendor original printing software configured to support the printer from the vendor.

18. The method of claim 11, wherein the second vendor original printing software is configured to support limited features, the method further comprising:
highlighting differences between the second vendor original printing software and the universal printing software, and differences between the second vendor original printing software and the vendor original printing software on the user interface of the second vendor original printing software.

19. A system comprising:
a printer from a vendor; and
a client device, the client device comprising:
a processor configured to execute software stored in memory;
a non-transitory memory having stored in the non-transitory memory, a universal printing software and a vendor original printing software;
a display screen configured to display a user interface of the vendor original printing software;
the universal printing software being configured to support printers from two or more vendors, and the vendor original printing software being configured to support the printer from the vendor;
the universal printing software being configured to support a limited number of features of the printer from the vendor; and
wherein the user interface of the vendor original printing software is configured to display features of the printer from the vendor and highlight features which are not supported by the universal printing software but supported by the vendor original printing software when a property of the vendor original printing software is selected at a time of printing on the user interface of the vendor original printing software.

20. The system of claim 19, wherein the interface of the vendor original printing software is configured to update the highlighted features when a feature is supported by a latest version of the universal printing software.

* * * * *